(12) United States Patent
Sepulveda Reyes et al.

(10) Patent No.: US 8,957,231 B2
(45) Date of Patent: Feb. 17, 2015

(54) CONCENTRATE OF OMEGA 3

(75) Inventors: Juvenal Antonio Sepulveda Reyes, Santiago (CL); Miriam Rosa Berrios Cornejo, Santiago (CL); Miguel Angel Fuenzalida Dias, Santiago (CL); Alejandro Markovits Rojas, Santiago (CL); Thomas Francis Harting Glade, Santiago (CL)

(73) Assignee: Golden Omega S.A., Santiago (CL)

( * ) Notice: Subject to any disclaimer, the term of this patent is extended or adjusted under 35 U.S.C. 154(b) by 39 days.

(21) Appl. No.: 13/994,785

(22) PCT Filed: Dec. 25, 2011

(86) PCT No.: PCT/CL2011/000082
§ 371 (c)(1),
(2), (4) Date: Jun. 17, 2013

(87) PCT Pub. No.: WO2012/088620
PCT Pub. Date: Jul. 5, 2012

(65) Prior Publication Data
US 2013/0267600 A1 Oct. 10, 2013

(30) Foreign Application Priority Data
Dec. 27, 2010 (CL) .................................. 1587-2010

(51) Int. Cl.
| *C07C 51/00* | (2006.01) |
| *C11B 3/00* | (2006.01) |
| *A23D 9/00* | (2006.01) |
| *C11B 1/10* | (2006.01) |
| *C11C 1/10* | (2006.01) |
| *C11C 3/00* | (2006.01) |
| *C11C 1/08* | (2006.01) |

(52) U.S. Cl.
CPC . *C11B 3/001* (2013.01); *A23D 9/00* (2013.01); *C11B 1/10* (2013.01); *C11C 1/10* (2013.01); *C11C 3/003* (2013.01); *C11C 1/08* (2013.01)
USPC .......................................... 554/170; 554/224

(58) Field of Classification Search
None
See application file for complete search history.

(56) References Cited

U.S. PATENT DOCUMENTS

| 5,679,809 | A | 10/1997 | Bertoli et al. |
| 6,664,405 | B2 | 12/2003 | Lee |
| 2003/0027865 | A1 | 2/2003 | Lee |

FOREIGN PATENT DOCUMENTS

| EP | 1211304 A3 | 7/2002 |
| WO | WO2009020406 A1 | 2/2009 |

OTHER PUBLICATIONS

International Search Report mailed May 6, 2012, which issued in corresponding International Application No. PCT/CL2011/000082.

*Primary Examiner* — Hasan Ahmed
(74) *Attorney, Agent, or Firm* — Fish & Richardson P.C.

(57) ABSTRACT

An efficient and simple process to obtain a concentrate that includes over 80% in weight of ethyl esters of ω-3 fatty acids based on a composition of matter that contains esters of ω-3 fatty acids or free ω-3 fatty acids that comprises the stages of:
  a) contacting the composition of matter with ethanol of at least 96% in weight and a hydroxide of an alkali metal at a temperature between 60 and 200° C. to form a liquid mixture that includes alkaline salts of fatty acids;
  b) cool the liquid mixture to a temperature between 50 and −20° C. to form a solid phase and a liquid phase and separate the liquid phase from the solid phase;
  c) contact the separated liquid phase of stage b) with an acid to form an acidified mixture with a water content under 10%, where the mixture consists of a solid phase that includes the alkali metal salt of the acid and a liquid phase that comprises ω-3 fatty acids;
  d) heat the mixture of stage c) between 50 to 150° C. in the presence of an esterification catalyst to form a mixture that includes ethyl esters of ω-3 fatty acids;
  e) contact the mixture of stage d) with an alkali to form a neutralized mixture;
  f) distill the neutralized mixture to obtain a distillate that includes over 80% in weight of ethyl esters of ω-3 fatty acids.

6 Claims, No Drawings

CONCENTRATE OF OMEGA 3

CROSS REFERENCE TO PRIOR APPLICATIONS

This is a U.S. National Phase application under 35 U.S.C. §371 of International Patent Application No. PCT/CL2011/000082, filed Dec. 25, 2011, and claims the priority of Chilean Patent Application No. 1587-2010, filed Dec. 27, 2010 both of which are incorporated by reference herein in their entirety. The International Application published in Spanish on Jul. 5, 2012 as WO 2012/088620 under PCT Article 21(2).

This invention is related to an efficient and simple process for obtaining concentrates of ω-3 fatty acids containing over 80% of ω-3 fatty acids from compositions of matter that contains ω-3 fatty acids in the form of esters or free fatty acids.

STATE OF THE ART

The usefulness of long-chain polyunsaturated fatty acids of the ω-3 type, such as the octadecatrienoic acids (ALA; α-linolenic acid), eicosapentaenoic (EPA) and docosahexaenoic (DHA) acids, in the prevention of arteriosclerosis and cardiovascular diseases, relief of inflammatory conditions and delay in tumor growth is currently well known and documented. The natural isomers of these ω-3 fatty acids have all cis configurations and their double bonds are separated one from another by a methylene unit. When the double links are separated one from another by two or more simple bonds, they are named isolated double bonds. The experts recommend a daily intake of ω-3 fatty acids in doses that vary between 0.5 to 10 g. Therefore there is a growing interest in obtaining concentrates of ω-3 fatty acids for their incorporation into food products, nutraceuticals and pharmaceuticals.

One of the sources that is richest in ω-3 fatty acids, principally EPA and DHA, is the oil of marine origin such as fish oils of different species such as the sardine, jack mackerel, anchovy, salmon, codfish and hill, marine microalgae such as *Phaeodactylum tricornotum, Nannochloropsis* sp., and vegetable oils such as seeds of linseed, hemp and others rich in ALA. The combined content of EPA and DHA in the oils of marine origin is typically between 10 and 35% in weight. Refined fish oils are currently being used in the food and nutraceutic industry as a source of refined ω-3 fatty acids. Generally speaking, the refining processes of the fish oils are adaptations of the classic refining processes of vegetable oils and manage to reduce the unpleasant smells and flavors characteristic of fish oils so as to allow their food and nutraceutical use. Some of these processes are divulged in U.S. Pat. Nos. 4,915,876, 4,874,629, 4,804,555, 4,599,143 and 4,838,997, among others. One advantage of the known fish oil refining processes, in addition to managing to make these oils suitable for human consumption, is that in these processes no significant losses are produced in the original concentration of ω-3 fatty acids in those oils.

Nevertheless, the preparation of special nutraceutic and pharmaceutical products requires products with a content of ω-3 fatty acids above 60%, at least 70%, preferably above 80% in weight, which evidently cannot be achieved using the traditional oil refining processes.

There are numerous processes in the state of the art for the production of concentrates with a content of ω-3 fatty acids above 60% in weight based on oils of marine origin. As EPA and DHA are found in marine oils mostly in the form of triglycerides and/or phospholipids as in the case of krill, most of the concentration processes begin with the chemical or enzymatic transesterification of the oils with an alcohol, normally ethanol, or hydrolyzing the oils with an aqueous alkaline solution to form the salts of the fatty acids and the free acids from these salts. The products of the transesterification or of the hydrolysis are then submitted to fractionation processes to reach the desired products. Normally it is impossible to obtain concentrates with a high content of ω-3 fatty acids with a single fractionation technique, therefore a combination of techniques are used.

The formation of complexes with urea is one of the fractionation techniques most commonly used for the recovery of concentrates with a high content of EPA and/or DHA.

Urea has the characteristic of forming solid complexes or adducts with saturated aliphatic organic compounds. When a solution of urea is added to a composition derived from oil that contains free fatty acids or their esters with a monohydric alcohol, a crystalline complex or adduct is formed that contains the most saturated fraction of the acids. The complexes can then be removed, leaving a raffinate of the more unsaturated acids. The complexation process has been used both with free acids as well as with their methyl or ethyl esters.

The raffinate can then be submitted to other stages of fractioning, such as, for example, molecular distillation of one or more stages which allows for products to be obtained with more than 80% in weight of ω-3 fatty acids, as disclosed by Breivik et al, in U.S. Pat. No. 5,945,318.

Other purification techniques of the raffinate using urea that have been used include the fractional crystallization of the raffinate in presence of an organic solvent such as acetone disclosed by Rubin et al. in U.S. Pat. No. 4,792,418; high pressure liquid chromatography of the raffinate in columns filled with Ag-silica or Ag-alumina disclosed by Lee in U.S. Pat. No. 6,664,405 and the treatment of the raffinate with active carbon and hexane, disclosed by Wang in U.S. Pat. No. 5,679,809.

Nevertheless, the processes that involve the utilization of urea have various disadvantages and inconveniences. The first of these is the low recovery yield of the ω-3 fatty acids, normally of about 30% as the adducts of urea in addition to the saturated fatty acids contain considerable amounts of ω-3 fatty acids also and at present there is no economically efficient process for the recovery of unsaturated fatty acids from the adducts of urea, making the process very expensive and requiring the use of complex equipment and large-scale facilities in relation to the production. For example, for each ton of fish oil, between 60 to 80 kilos of the end product are recovered, that is, less than 8% (Breivik, Harald [2007], "Long Chain Omega-3 Specialty Oils", The Oily Press).

Additionally, the large amount of urea adducts formed, because for each ton of marine oil between one to three tons of urea are used, represents a formidable challenge for its environmental disposal; and, moreover, the production of two potent carcinogens, ethyl or methyl carbamates, have also been reported in the process (Cañas B l, Yurawecz M P [1999] "Ethyl carbamate formation during urea complexation for fractionation of fatty acids". J. Am Oil Chem Soc 76:537).

In spite of the disadvantages and complexities of the refining process of ω-3 fatty acids using urea, these processes represent more than 85% of the world's current production of concentrates with a content over 80% of ω-3 fatty acids.

Few processes have been disclosed for the production of concentrated ω-3 fatty acids that do not use a fractionation stage with urea. One of these is the process described by Kokubu et al. in Japanese patent application JP 1982000131654 where fish oil, after an alkaline hydrolysis is cooled between 25 and 5° C. to precipitate soaps of saturated fatty acids. Once the supernatant is separated water is added to it, an organic solvent is extracted such as hexane, petroleum ether, benzene or another. The aqueous phase extracted is acidified with a mineral acid to form an aqueous phase and an organic phase containing the fatty acids formed, they are extracted once again with an organic solvent such as hexane, petroleum ether, benzene or another, and the organic phase extracted is submitted to a color and odor removing process by adsorption and steam distillation or by molecular distillation.

The process disclosed is only capable of producing concentrates with content between 60 to 70% of EPA and DHA, which is still insufficient for the formulation of special products for pharmaceutical and nutraceutic use. Additionally, it uses one or more extraction stages with hydrocarbons or hydrocarbonated solvents whose maximum permissible concentration of products for human consumption is very restricted. In the processes for the production of nutraceutical or pharmaceutical ingredients the use of organic solvents whose maximum permissible concentration in products for human consumption is very low, less than 1 mg/kg (as in the case of hexane) is not convenient, because among other technical and economic inconveniences, the removal of those solvents, to be able to comply with the regulations, could affect the quality of the ω-3 fatty acids.

Morgan, in application WO 2009/20406 A1 reveals a concentration process of ω-3 fatty acids from fish oil by means of hydrolysis at a low temperature and does not use organic solvents whose maximum permissible concentration in products for human consumption is very low, less than 1 mg/kg. The concentrations of ω-3 fatty acids that can be reached in the process disclosed are not revealed in the specification, but the examples indicate that the concentrations of the direct products of the process disclosed vary between 46 to 65%. Although it is obvious, the inventor discloses that the fatty acids enriched in polyunsaturated fatty acids "obtained using the methods of the invention can be further purified by means of known techniques such as distillation, fractionated crystallization or formation of a urea complex". In Example 2, the concentration of ω-3 fatty acids of the product obtained directly by means of the process of the invention was 65%. The product submitted to a recrystallization stage (Example 3) had a content of 75% of ω-3 fatty acids, still insufficient for use in special nutraceutical and pharmaceutical applications.

Another process is divulged by Cornieri et al. in U.S. Pat. No. 5,130,061 where after the chemical transesterification of the fish oil, the esters are extracted with an organic solvent such as hexane and after removing the solvent, the product is submitted to a chromatography in silica gel followed by molecular distillation to obtain a concentrate of EPA and DHA but with a content lower than 70% in weight. To improve the concentration, the product that has been chromatographed in silica gel is dissolved in acetone, is crystallized at −40° C. and the resulting separated residue is subjected to a two-stage molecular distillation, which makes it possible to reach concentrations of esters of DHA between 85-95%. This process also has a stage that uses hexane that has the difficulties mentioned. The chromatographic purification stage makes the process economically unattractive, and its industrial implementation is also complex. Moreover, the recovery yield of ω-3 fatty acids is low, less than 30%.

Up until 1986, the Norwegian company Jahres Fabrikker produced a concentrate of EPA and DHA from fish oil. The process consisted of saponifying the fish oil with an aqueous solution of sodium hydroxide to form solid soaps that were later extracted with a solvent, typically methanol. The methanol extract was acidulated and the free fatty acids with a content of EPA and DHA of 50% were isolated. (Breivik, Harald [2007] "Long Chain Omega-3 Specialty Oils" The Oily Press). The fatty acids were distilled molecularly to reach a maximum concentration of 65%.

No efficient processes are known in the state of the art for obtaining concentrates of ω-3 fatty acids with a content of ω-3 fatty acids over 80% that do not use fractioning with urea or organic solvents whose maximum permissible concentration in products for human consumption is restricted.

For special pharmaceutical and nutraceutical applications, it is important that in the concentrates of ω-3 fatty acids those fatty acids correspond to the natural isomers with all cis configurations and with double bonds arranged in a system of isolated double bonds separated one from the other by a methyl group.

Nevertheless, during the processes for the production of concentrates of ω-3 fatty acids, trans type isomers and also conjugated isomers are produced where two or more double bonds are separated by a single simple bond.

Processes have been divulged for the production of concentrates of ω-3 fatty acids in which changes in the natural configuration of those acids have not taken place, but with no reference whatsoever to the problem of the isomerization of the double bonds. Surprisingly, it has been found that in the products obtained by the process of this invention no trans type isomers have been detected, nor isomers with conjugated double bonds.

Consequently, the objective of this invention is to provide an efficient and simple process that does not use fractioning with urea or organic solvents whose maximum permissible concentration in products for human consumption is restricted, for the production of concentrates of ω-3 fatty acids containing over 80% of ω-3 fatty acids based on compositions of matter that contains these fatty acids in the form of esters or free fatty acids, suitable for human consumption and of pharmaceutical quality.

This objective is obtained through the procedure that comprises the stages of:
  a) contact the composition of matter that contains fatty acids in the form of esters or free fatty acids with ethanol of at least 96% in weight and a hydroxide of an alkaline metal at a temperature between 60 and 200° C. to form a liquid mixture that comprises alkaline salts of fatty acids;
  b) cool the liquid mixture to a temperature between 50 and −20° C. to form a solid phase and a liquid phase and separate the liquid phase from the solid phase;
  c) contact the liquid phase separated in stage b) with an acid to form an acidified mixture with a content of water below 10%, where the mixture consists of a solid phase comprising the metal alkaline salt of the acid and a liquid phase comprising ω-3 fatty acids and separate the two phases;
  d) heat the liquid phase of stage c) between 50 to 150° C. in the presence of an esterification catalyst to form a mixture that comprises ethyl esters of ω-3 fatty acids;
  e) contact the mixture of stage d) with an alkyl to form a neutralized mixture, that comprises ethyl esters of ω-3 fatty acids and separate the ethyl esters of the neutralized mixture;
  f) distill the ethyl esters of stage e) to obtain a distillate that comprises over 80% in weight of the ethyl esters of ω-3 fatty acids.

DETAILED DESCRIPTION OF THE INVENTION

For the process described in this patent application, the raw material used is any composition of matter that contains esterified ω-3 fatty acids either in the form of triglycerides, phospholipids or other forms, such as in oils or fats of animal origin, such as crude or refined fish oil of different species such as sardines, jack mackerel, anchovy, salmon, cod, krill, marine microalgae such as *Phaeodactylum tricornotum, Nannochloropsis* sp, of vegetable origin such as vegetable oils of linseed, hemp seeds, mixtures of oils or fats of marine origin with vegetable oils, or also in the form of monoesters or free fatty acids, products of different sources or commercial processes. Typically, the combined content of ω-3 fatty acids (EPA and DHA) in the fish oils is between 10 to 35% in weight, while in the vegetable oils (ALA) it is very variable and may reach close to 50% as in the oil from linseed. In this invention, the word oil also includes fats that contain ω-3 fatty acids. The difference between oil and fat lies in that the former are liquid while the latter are solid at room temperature. The lipids extracted from various marine microalgae are solid at room temperature and can contain between 5 to 30% of ω-3 fatty acids. Also useful as raw material for this invention are the lipids extracted from insects, insect larvae and plants modified genetically for the production of long chain ω-3 fatty acids.

To carry out the invention, the raw material containing ω-3 fatty acids is submitted first to a saponification or neutralization stage with a hydroxide of an alkaline metal to form a reacted mixture that comprises alkali metal salts of the fatty acids. To do this, the raw material is put into contact with ethanol preferably anhydride, with a water content of not more than 4% in weight, preferably less than 1%, and with a hydroxide of an alkali metal, preferably sodium hydroxide, or a hydroxide solution of an alkali metal, preferably sodium hydroxide, at temperatures between 60 and 200° C., preferable at 120° C. and low pressure. If a solution of sodium hydroxide is used, the solution of sodium hydroxide is chosen from the group that consists of an aqueous solution of sodium hydroxide over 40% in weight and a solution in ethanol of sodium hydroxide under 50% in weight. At this temperature the reaction time for the saponification or neutralization of the raw material only takes a few minutes, which additionally has the advantage of being able to carry out the reaction in a simple and continuous process. The amount of ethanol that is used in the reaction may vary between 0.5 to 10 kg per kilo of raw material, preferably between 1 and 6 kilos per kilo of raw material, while the amount of hydroxide of the alkali metal that is used in the reaction is equal to or more than the 90% molar, preferably over 100% of the value indicated by the saponification index that, in the case of using sodium hydroxide, represents at least 0.712 g of sodium hydroxide per kilo of raw material multiplied by the saponification index of the raw material. The reaction may be carried out in batches or continuously in a shaken container or tubular container or another type normally used in the saponification of oils and fats. When the raw material used in this patent application is a crude or refined fish oil, either alone or combined with vegetable oil, this raw material or crude or refined fish oil may be, optionally, purified to remove possible Persistent Organic Contaminants (POCs) that may be present by means of processes known in the state of the art. POCs are toxic chemical products that accumulate in the fatty tissues of live organisms. Relatively high levels of POCs have been found in different fish species and consequently in the meal and oil produced from these species. The POCs include pesticides, industrial chemical products such as polychlorinated biphenyls, by-products of industrial processes such as dioxins and furans. Similarly, a POC-removal stage can be applied in the products of this invention.

At the end of this stage, the reacted mixture is cooled to a temperature between 50 and −20° C., preferably between 50 and 0° C., which produces the precipitation of a part of the alkali metal or sodium salts formed during the reaction and that comprises salts of saturated fatty acids. The cooling of the reacted mixture can be carried out in batches or continuously in a shaken container, provided with any mechanical shaker, such as flat-bladed turbines or anchor-type agitators, among others, wall-cooled and/or by evaporation, or tubular container, preferably shaken by surface scraping stirrers, or another type habitually used in the crystallization of oils and fats. Then the solid phase, that comprises the precipitated metal alkali salts, and the liquid phase of the resulting cooled mixture are separated by mechanical means such as centrifugation or filtration, preferably by means of vacuum or pressure filtration. Optionally, the liquid phase or the liquid phase concentrated beforehand by evaporation, can be cooled again until more solids are precipitated and then separate the liquid phase from the precipitated solid as has been described and then submit that liquid phase to the following acidification stage.

The separated liquid stage is submitted to an acidification stage with an acid or with a mixture of acid with ethanol, preferably sulfuric acid, to obtain an acidified mixture that comprises a liquid phase comprising free ω-3 fatty acids and a solid phase containing the alkali metal or sodium salt of the acid. The acidified mixture comprises less than 10% in weight of water, preferably less than 5%, which permits the generation of a liquid phase and a solid suspended in said liquid phase. The percentage of acid in the mixture of acid and ethanol is less than 50% in weight. If sulfuric acid is used, it would be recommendable that a solution in ethanol be prepared preferably less than 20% and at a temperature lower than 20° C., preferably less than 10° C. so as to avoid the formation of ethanol sulfates. The amount of acid or of acid mixed with ethanol to be used will depend on the total alkalinity of the liquid phase separated after the cooling stage, using a slight excess, between 1 to 10% over the stoichiometric value of the total alkalinity. Preferably the metal or sodium alkaline salt formed during the acidification stage, that is practically insoluble in the acidified mixture, is separated from the acidified mixture, preferably by centrifugation, filtering or decantation, to obtain a clarified liquid that comprises ω-3 fatty acids.

The acidified mixture or the clarified liquid are heated to a temperature between 50 to 150° C. to cause the fatty acids to react with the ethanol present to form an esterified mixture that comprises ethyl esters of the fatty acids. During the esterification, in the event that the acidification stage has been executed with sulfuric acid, the same sulfuric acid present also acts as a catalyst of the esterification reaction. Nevertheless, if desired, more sulfuric acid or another esterification catalyst such as p-toluene sulfonic acid can be added to the acidified mixture or to the clarified liquid prior to or during its heating. Likewise, in the event that the acidification stage has been executed with an acid other than the sulfuric acid, such as hydrochloric acid, an esterification catalyst must be added to the acidified mixture or to the clarified liquid prior to or during its heating. It is convenient to minimize the use of water in the prior stages as it affects the esterification conversion of the fatty acids.

The esterified mixture is then contacted with an aqueous or ethanol solution of an alkali, where the alkali is chosen from the group formed by an oxide, hydroxide and carbonate of an alkaline metal, ammonia and ammonium hydroxide, preferably sodium hydroxide to form a neutralized or alkaline mixture. Following, the ethyl esters of ω-3 fatty acids are recovered from the neutralized mixture by means of techniques that are evident to a person normally skilled in the art, and that are illustrated in the examples. One alternative for recovery of the ethyl esters of the neutralized or alkaline mixture is executed contacting an ethanol solution of sodium hydroxide with the esterified mixture to form the neutralized or alkaline mixture, evaporating the solvent of the neutralized or alkaline mixture to form a residue formed by a light phase that comprises ethyl esters of ω-3 fatty acids and a heavy phase that comprises inorganic salts or glycerin and separating the two phases by decantation or centrifugation. Optionally, the light phase is washed with water or an aqueous solution of a salt.

Another alternative consists of contacting the esterified mixture with an aqueous solution of sodium hydroxide to form a neutralized mixture that contains a light phase that comprises ethyl esters of ω-3 fatty acids and a heavy phase that comprises inorganic salts, water, ethanol or glycerin. The phases are separated by decantation or centrifugation. The light phase, optionally, is washed with water or an aqueous solution of a salt.

Then, the light phase separated from the neutralized mixture, that comprises ethyl esters or ω-3 fatty acids is submitted to one or more stages of vacuum distilling to obtain a concentrate of ethyl esters of ω-3 fatty acids with a content over 80%, typically over 90%. The distillation stage is executed preferably in a molecular or short path distiller at a temperature between 100 and 250° C. and at a pressure below 1 mbar. When the raw material consists of fish oil, the process of this invention typically permits obtaining concentrates of ω-3 fatty acids EPA plus DHA over 80%.

The process invented has the additional advantage of a high recovery yield of ω-3 fatty acids over 30%, typically over 40% of efficiency if fish oil is used as the raw material, a surprisingly high value in relation to the processes of the state of the art. Additionally, the process of this invention permits the processing of raw materials with a low content of ω-3 fatty acids, without detriment to the high efficiency of the process. On the contrary, the industrial processes for the production of concentrates of ω-3 fatty acids using urea and molecular distilling require raw materials with a high content of ω-3 fatty acids, typically over 28%. Also, all the by-products of the stages of the process of this invention have direct industrial application which translates into an efficient utilization of a renewable raw material.

Surprisingly, undesired compounds such as trans fatty acids or products of the sulfating of ethanol, such as diethyl sulfate, have not been detected in the process disclosed, as is evident from the examples, and additionally, the ethyl esters of ω-3 fatty acids do not present conjugated bonding.

EXAMPLES

The analyses of the content and profile of ω-3 fatty acids both in the raw material as well as in the products were executed using the procedures disclosed in "Official methods and recommended practices of the AOCS", $6^{th}$ edition.

Example 1

Obtaining a Concentrate of Ethyl Esters of ω-3 Fatty Acids Starting with Sardine Oil 276 g of sodium hydroxide, 6 kg of ethanol at 99.2% and 2 kg of sardine oil (SouthPacific Korp, with a content of ω-3 fatty acids of 32.9%; EPA 16.8% and DHA 11.3%) were mixed in a Parr 20-liter pressure reactor with stirrer. The mixture was heated at 120° C. for 5 minutes at 250 rpm of stirring and was then cooled to 35° C. at 100 rpm.

The cooled mixture was vacuum filtered in a Büchner & Kitasato funnel over a polyester cloth and a first filtrate was obtained. The cake collected in the filter was washed with 6,000 g of ethanol, recovering a second filtrate that was mixed with the first filtrate.

The filtrates were mixed with 1,700 g of a solution of sulfuric acid at 10% in ethanol at 0° C. and an acidified mixture was formed with dispersed insoluble solids. The solids were separated by centrifugation and a clarified solution was obtained.

The clarified solution was loaded in a reactor provided with a stirrer, external condenser and vacuum connection. 70% of the load was distilled at room temperature. Then 25 g of sulfuric acid at 20% in ethanol was loaded, it was heated to 76° C. for 30 minutes and cooled to 20° C. Subsequently 150 g of a solution of sodium hydroxide at 8% in ethanol was added and the totality of the ethanol present was then evaporated up to a pressure of 10 mbar. The final residue was allowed to decant for 5 minutes to separate approximately 205 g of a heavy phase. The light phase was washed with water and 1,056 g of crude ethyl esters was recovered.

The crude ethyl esters were fed into a short path distiller, UIC brand, model KDL 5 and distilled in two stages. In the first stage, the feed was distilled at a jacket temperature of 85° C., internal condenser temperature of 5° C. and a vacuum level of 0.02 mbar. The residue was collected and distilled in a second stage at a jacket temperature of 110° C., internal condenser temperature of 5° C. and a vacuum level of 0.01 mbar, collecting 451 g of distillate with a content of ethyl esters of ω-3 fatty acids of 97.1%; ethyl esters of EPA 45.2% and ethyl esters of DHA 37.3%.

The overall recovery yield of ω-3 fatty acids was 60%.

Example 2

Obtaining a Concentrate of Ethyl Esters of ω-3 Fatty Acids from Jack Mackerel Oil 281 g of sodium hydroxide, 11 kg of ethanol at 99.2% and 2 kg of jack mackerel oil (SouthPacific Korp, with a content of ω-3 fatty acids of 38.5%; EPA 12.5% and DHA 20.4%) in a Parr 20-liter pressure reactor with stirrer. The mixture was heated at 120° C. for 5 minutes at 250 rpm of stirring and was then cooled to 5° C. at 100 rpm of stirring.

The cooled mixture was vacuum filtered in a Büchner & Kitasato funnel over a polyester cloth and a first filtrate was obtained. The cake collected in the filter was washed with 3,000 g of ethanol, recovering a second filtrate that was mixed with the first filtrate.

The filtrates were mixed with 370 g of HCl at 36%, previously dissolved with 370 g of ethanol, and an acidified mix was formed with dispersed insoluble solids. The solids were separated by centrifugation to obtain a clarified solution.

The clarified solution was mixed with 6 g of p-toluene sulfonic acid in a reactor provided with a stirrer, external condenser and vacuum connection. 70% of the load was distilled at room temperature. Then 20 g of a solution of sodium hydroxide at 50% was added, and the totality of the ethanol present was then evaporated up to a pressure of 10 mbar. The residue was allowed to decant to separate a heavy phase. The light phase was washed with an aqueous solution of sodium sulfate at 2% in weight and 977 g of crude ethyl esters was recovered.

The crude ethyl esters were fed into a short path distiller, UIC brand, model KDL 5 and distilled in two stages. In the first stage, the feed was distilled at a jacket temperature of 84° C., internal condenser temperature of 5° C. and a vacuum level of 0.02 mbar. The residue was collected and distilled in a second stage at a jacket temperature of 114° C., internal condenser temperature of 5° C. and a vacuum level of 0.01 mbar, collecting 508 g of distillate with a content of ethyl esters of ω-3 fatty acids of 92.6%; ethyl esters of EPA 30.2% and ethyl esters of DHA 52.3%.

The overall recovery yield of ω-3 fatty acids was 56%.

Example 3

Obtaining a Concentrate of Ethyl Esters of ω-3 Fatty Acids from Linseed Oil 560 g of sodium hydroxide at 50%, 10 kg of ethanol at 99.2% and 2 kg of linseed oil (Terrasol, with a content of ω-3 fatty acids of 51.7%; ALA 51.7%) in a Parr 20-liter pressure reactor with stirrer. The mixture was heated at 80° C. for 25 minutes at 250 rpm of stirring and was then cooled to 0° C. at 100 rpm.

The cooled mixture was vacuum filtered in a Büchner & Kitasato funnel over a polyester cloth and a first filtrate was obtained. The cake collected in the filter was washed with 2,000 g of ethanol, recovering a second filtrate that was mixed with the first filtrate.

The filtrates were mixed with 180 g of concentrated sulfuric acid, and an acidified mix was formed with dispersed insoluble solids.

The clarified solution was mixed with 7 g of p-toluene sulfonic acid in a reactor provided with a stirrer, external condenser and vacuum connection. 70% of the load was distilled at room temperature. Then the concentrated mixture was filtered under pressure to obtain a clarified product to which 20 g of a solution of sodium hydroxide at 50% was added, and the totality of the ethanol present was then evaporated up to a pressure of 10 mbar. The residue was allowed to decant and the heavy phase was separated. The light phase was washed with water and 871 g of crude ethyl esters was recovered.

The crude ethyl esters were fed into a short path distiller, UIC brand, model KDL 5 and distilled in two stages. In the first stage, the feed was distilled at a jacket temperature of 72° C., internal condenser temperature of 5° C. and a vacuum level of 0.02 mbar. The residue was collected and distilled in a second stage at a jacket temperature of 95° C., internal condenser temperature of 5° C. and a vacuum level of 0.01 mbar, collecting 580 g of distillate with a content of ethyl esters of ω-3 fatty acids of 89.6%; ethyl esters of ALA 89.6%.

The overall recovery yield of ω-3 fatty acids was 45%.

Example 4

Obtaining a Concentrate of Ethyl Esters of ω-3 Fatty Acids from Krill Oil

The test of Example 1 was repeated, using krill oil with a content of ω-3 fatty acids of 27.5%; EPA 9.5% and DHA 15.4%.

354 g of final distillate were obtained, with a content of ethyl esters of ω-3 fatty acids of 92.3%; ethyl esters of EPA 28.3% and ethyl esters of DHA 56.6%.

The overall recovery yield of ω-3 fatty acids was 54%.

Example 5

Obtaining a Concentrate of Ethyl Esters of ω-3 Fatty Acids from a Mixture of Linseed Oil and Sardine Oil The test of Example 1 was repeated using 500 g of linseed oil of Example 3 and 1,500 g of sardine oil of Example 1.

514 g of final distillate were obtained, with a content of ethyl esters of ω-3 fatty acids of 88.9%; ethyl esters of ALA 29.8%; ethyl esters of EPA 26.3% and ethyl esters of DHA 17.1%.

The overall recovery yield of ω-3 fatty acids was 47%.

Example 6

Obtaining a Concentrate of Ethyl Esters of ω-3 Fatty Acids from the Fatty Acids of Fish 280 g of sodium hydroxide, 10 kg of ethanol at 99.2% and 2 kg of free fatty acids of fish (SouthPacific Korp, with a content of ω-3 fatty acids of 26.8%; EPA 13.6% and DHA 9.2%) in a Parr 20-liter pressure reactor with stirrer. The mixture was heated at 60° C. for 15 minutes at 250 rpm of stirring and was then cooled to 25° C. at 100 rpm of stirring.

The cooled mixture was vacuum filtered in a Büchner & Kitasato funnel over a polyester cloth and a first filtrate was recovered. The cake collected in the filter was washed with 3,000 g of ethanol, recovering a second filtrate that was mixed with the first filtrate.

The filtrates were mixed with 400 g of HCl at 36%, previously dissolved with 400 g of ethanol, and an acidified mix was formed with dispersed insoluble solids. The solids were separated by pressure filtering and a clarified solution was obtained.

The clarified solution was mixed with 5 g of p-toluene sulfonic acid in a reactor provided with a stirrer, external condenser and vacuum connection. 70% of the load was distilled at room temperature. Then 100 g of a solution of sodium hydroxide at 8% in ethanol was added, and the totality of the ethanol present was then evaporated up to a pressure of 10 mbar. The residue of the distillation was washed with water. 820 g of crude ethyl esters was recovered.

The crude ethyl esters were fed into a short path distiller, UIC brand, model KDL 5 and distilled in two stages. In the first stage, the feed was distilled at a jacket temperature of 77° C., internal condenser temperature of 5° C. and a vacuum level of 0.02 mbar. The residue was collected and distilled in a second stage at a jacket temperature of 114° C., internal condenser temperature of 5° C. and a vacuum level of 0.01 mbar, collecting 409 g of distillate with a content of ethyl esters of ω-3 fatty acids of 87.0%; ethyl esters of EPA 40.5% and ethyl esters of DHA 33.5%.

The overall recovery yield of ω-3 fatty acids was 60%.

Example 7

Obtaining a Concentrate of Ethyl Esters of ω-3 Fatty Acids from Fish Oil with a Low Content of ω-3 Fatty Acids The test of Example 1 was repeated using crude, low quality fish oil with a content of ω-3 fatty acids of 23.5%; EPA 12.5% and DHA 8.4% and an acid number of 19 mg KOH/g sample.

235 g of final distillate was obtained, with a content of ethyl esters of ω-3 fatty acids of 90.3%; ethyl esters of EPA 55.1% and ethyl esters of DHA 27.5%.

The overall recovery performance of ω-3 fatty acids was 42%.

Example 8

Obtaining a Concentrate of Ethyl Esters of ω-3 Fatty Acids from Sardine Oil 280 g of sodium hydroxide, 6 kg of ethanol at 99.2% and 2 kg of sardine oil (SouthPacific Korp, with a content of ω-3 fatty acids of 32.9%; EPA 16.8% and DHA 11.3%) in a Parr 20-liter pressure reactor with stirrer. The mixture was heated at 120° C. for 5 minutes at 250 rpm of stirring and was then cooled to 48° C. at 100 rpm of stirring.

The cooled mixture was vacuum filtered in a Büchner & Kitasato funnel over a polyester cloth and a first filtrate was recovered. The cake collected in the filter was washed with 2,000 g of ethanol, recovering a second filtrate that was mixed with the first filtrate. The mixture of filtrates was concentrated by evaporation up to 50% of the load, to obtain a residue that was cooled to 0° C. The residue was filtered and a third filtrate was obtained.

The third filtrate was mixed with 1,200 g of a solution of sulfuric acid at 10% in ethanol at 0° C. and an acidified mix was formed with dispersed insoluble solids. The solids were separated by centrifugation and a clarified solution was obtained.

The clarified solution was loaded in a reactor provided with a stirrer, external condenser and vacuum connection. 50% of the load was distilled at room temperature. Then 25 g of sulfuric acid at 20% in ethanol was loaded, it was heated at 78° C. for 30 minutes and cooled to 20° C. Subsequently, a solution of sodium hydroxide at 8% in ethanol was added, and the totality of the ethanol present was then evaporated up to a pressure of 10 mbar. The final residue was left to decant and the heavy phase was separated. The light phase was washed with water and 556 g of crude ethyl esters was recovered.

The crude ethyl esters were fed into a short path distiller, UIC brand, model KDL 5 and distilled in two stages. In the first stage, the feed was distilled at a jacket temperature of 88° C., internal condenser temperature of 5° C. and a vacuum level of 0.02 mbar. The residue was collected and distilled in a second stage at a jacket temperature of 115° C., internal condenser temperature of 5° C. and a vacuum level of 0.01 mbar. A concentrate was obtained with a content of ethyl esters of ω-3 fatty acids of 99.7%.

Example 9

Analysis of Trans Fatty Acids in Concentrates of Ethyl Esters of ω-3 Fatty Acids The content of trans fatty acids in the concentrates of ethyl esters of ω-3 fatty acids in the tests of examples 1 to 8 was analyzed using gaseous chromatography.

No trans fatty acids were detected in the samples of concentrates of ethyl esters of ω-3 fatty acids of the examples of this invention.

Example 10

Analysis of Conjugated Fatty Acids in Concentrates of Ethyl Esters of ω-3 Fatty Acids The content of conjugated fatty acids in the concentrates of ethyl esters of ω-3 fatty acids of the tests of examples 1 to 8 were analyzed using UV absorption spectroscopy.

No conjugated fatty acids were detected in the samples of concentrates of ethyl esters of ω-3 fatty acids of the examples of this invention.

Example 11

Analysis of Diethyl Sulfate (DES) in Concentrates of Ethyl Esters of ω-3 Fatty Acids An analysis was made of the DES content in the concentrates of ethyl esters of ω-3 fatty acids of the tests of examples 1 to 8 using gas chromatography with mass spectrometry.

No DES was detected in the samples of concentrates of ethyl esters of ω-3 fatty acids in the examples of this invention.

Example 12

Determination of Free Acidity, Peroxide Index and Anisidine Index

The value of the free acidity, peroxide index and anisidine index of the concentrates of ethyl esters of ω-3 fatty acids of the tests of examples 1 to 8 were determined using the international procedures divulged in the AOCS.

The free acidity was lower than 1 mg KOH/g of sample for all the concentrates of ethyl esters of ω-3 fatty acids.

The peroxide index was lower than 3 meq/kg of sample for all the concentrates of ethyl esters of ω-3 fatty acids.

The value of anisidine was lower than 15 for all the concentrates of ethyl esters of ω-3 fatty acids.

What is claimed is:

1. A process for obtaining a concentrate containing more than 80% by weight of ethyl esters of ω-3 fatty acids based on a composition of matter that contains esters of ω-3 fatty acids or free ω-3 fatty acids, which comprises:
   a) contacting the composition of matter with ethanol of at least 96% in weight and a hydroxide of an alkaline metal at a temperature between 60 and 200° C. to form a liquid mixture that includes alkaline salts of fatty acids;
   b) cooling the liquid mixture to a temperature between 50 and −20° C. to form a solid phase and a liquid phase and separating the liquid phase from the solid phase;
   c) contacting the separated liquid phase of stage b) with an acid to form an acidified mixture with a water content under 10%, wherein the mixture consists of a solid phase that includes the alkali metal salt of the acid and a liquid phase that comprises ω-3 fatty acids;
   d) heating the mixture of stage c) to between 50 and 150° C. in the presence of an esterification catalyst to form a mixture that includes ethyl esters of ω-3 fatty acids;
   e) contacting the mixture of stage d) with an alkali to form a neutralized mixture; and
   f) distilling the neutralized mixture to obtain a distillate that contains in excess of 80% by weight of ethyl esters of ω-3 fatty acids.

2. The process according to claim 1, wherein the temperature in stage a) is between 90 to 150° C.

3. The process according to claim 2, wherein the temperature in stage a) is 120° C.

4. The process according to claim 1, wherein the temperature in stage b) is between 50 and 0° C.

5. The process according to claim 1, wherein the acid in stage c) is a member selected from the group consisting of sulfuric acid and hydrochloric acid.

6. A concentrate of ethyl esters of ω-3 fatty acids that contains more than 80% by weight of ethyl esters of ω-3 fatty acids produced according to claim 1, wherein the ω-3 fatty acids of the ethyl esters have the all cis configuration and all their double bonds are separated one from another by a methylene unit.

* * * * *